US011995258B2

United States Patent
Wei et al.

(10) Patent No.: US 11,995,258 B2
(45) Date of Patent: May 28, 2024

(54) DISPLAY PANEL AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Qibing Wei, Wuhan (CN); Qingxia Wang, Wuhan (CN); Peng Zhang, Wuhan (CN); Kang Yang, Wuhan (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 18/111,906

(22) Filed: Feb. 21, 2023

(65) Prior Publication Data
US 2023/0205341 A1 Jun. 29, 2023

Related U.S. Application Data

(63) Continuation of application No. 17/690,033, filed on Mar. 9, 2022, now Pat. No. 11,609,649.

(30) Foreign Application Priority Data
Dec. 27, 2021 (CN) .......................... 202111618271.X

(51) Int. Cl.
*G06F 3/041* (2006.01)
*G06F 3/044* (2006.01)
*G06F 3/047* (2006.01)

(52) U.S. Cl.
CPC .......... *G06F 3/0412* (2013.01); *G06F 3/0446* (2019.05); *G06F 3/047* (2013.01); *G06F 2203/04103* (2013.01)

(58) Field of Classification Search
CPC ......... G06F 2203/04103; G06F 3/0412; G06F 3/04164; G06F 3/0446; G06F 3/047
See application file for complete search history.

(56) References Cited

U.S. PATENT DOCUMENTS

2011/0090170 A1* 4/2011 Lin ....................... G06F 3/0446
345/174
2020/0379605 A1* 12/2020 Zhang .................. G06F 3/0443
(Continued)

FOREIGN PATENT DOCUMENTS

| CN | 112198983 A | 1/2021 |
|---|---|---|
| CN | 214098387 U | 8/2021 |

OTHER PUBLICATIONS

The First Office Action for U.S. Appl. No. 17/690,033, dated Aug. 8, 2022, 14 pages.
(Continued)

*Primary Examiner* — Robin J Mishler
(74) *Attorney, Agent, or Firm* — East IP P.C.

(57) ABSTRACT

The embodiments of the present application provide a display panel and a display device. The display panel has a display area and a non-display area, the display panel includes: a substrate, a touch component arranged on the substrate, the touch component comprising touch electrodes located in the display area and touch leads connected to the touch electrodes and located in the non-display area; and a circuit board connected to the substrate in the non-display area, the touch leads being connected between the touch electrodes and the circuit board; and wherein the non-display area has a cutting track arranged surrounding at least part of the display area, at least part of the touch leads includes first redundant winding segments and connection segments, at least part of the first redundant winding seg-
(Continued)

ments extend along a direction away from the circuit board and fill between the cutting track and the display area.

13 Claims, 10 Drawing Sheets

(56) References Cited

U.S. PATENT DOCUMENTS

2021/0096674 A1  4/2021  Zhang et al.
2021/0247862 A1  8/2021  Jeong et al.

OTHER PUBLICATIONS

Notice of Allowance and Fee(s) Due for U.S. Appl. No. 17/690,033, dated Nov. 21, 2022, 5 pages.

\* cited by examiner

DISPLAY PANEL AND DISPLAY DEVICE

CROSS-REFERENCE TO RELATED APPLICATION

This application is a continuation of U.S. patent application Ser. No. 17/690,033, filed on Mar. 9, 2022, which claims priority to Chinese Patent Application No. 202111618271.X, filed on Dec. 27, 2021, both of which are hereby incorporated by reference in their entireties.

TECHNICAL FIELD

The present application relates to a technical field of display equipment, in particular to a display panel and a display device.

BACKGROUND

Existing display devices usually have touch components, and the touch components are usually used as an input device in the display device. For example, in a display device, a user may input information by pressing or touching a touch sensor while viewing an image displayed on a screen of the display device.

In a related touch display panel, the touch component includes touch electrodes located in a display area and touch trace located in a non-display area, and the touch trace is used to connect to a circuit board so as to transmit touch signals between the circuit board and the touch electrodes. Since the touch trace usually extends directly from the touch electrodes towards the circuit board, this results in ununiformity arrangement of the touch trace in the non-display area. In order to improve uniformity of wiring, dummy electric blocks surrounding the touch electrodes are also arranged in the non-display area, and charges are easily accumulated on the dummy electric blocks, which charges can easily affect the service life of the touch electrode blocks.

SUMMARY

The embodiments of the present application provide a display panel and a display device.

The embodiments of a first aspect of the present application provide a display panel having a display area and a non-display area, the display panel comprising: a substrate, a touch component arranged on the substrate, the touch component comprising touch electrodes located in the display area and touch leads connected to the touch electrodes and located in the non-display area; and a circuit board connected to the substrate in the non-display area, the touch leads being connected between the touch electrodes and the circuit board; and wherein the non-display area has a cutting track arranged surrounding at least part of the display area, at least part of the touch leads includes first redundant winding segments and connection segments, at least part of the first redundant winding segments extend along a direction away from the circuit board and fills between the cutting track and the display area, and the connection segments are connected between the first redundant winding segments and the circuit board.

The embodiments of a second aspect of the present application further provide a display device comprising the above-mentioned display panel.

BRIEF DESCRIPTION OF THE DRAWINGS

Other features, objects and advantages of the present application will become more apparent upon reading the following detailed description of non-limiting embodiments with reference to the accompanying drawings, wherein the same or similar reference numerals refer to the same or similar features.

Figure 1:
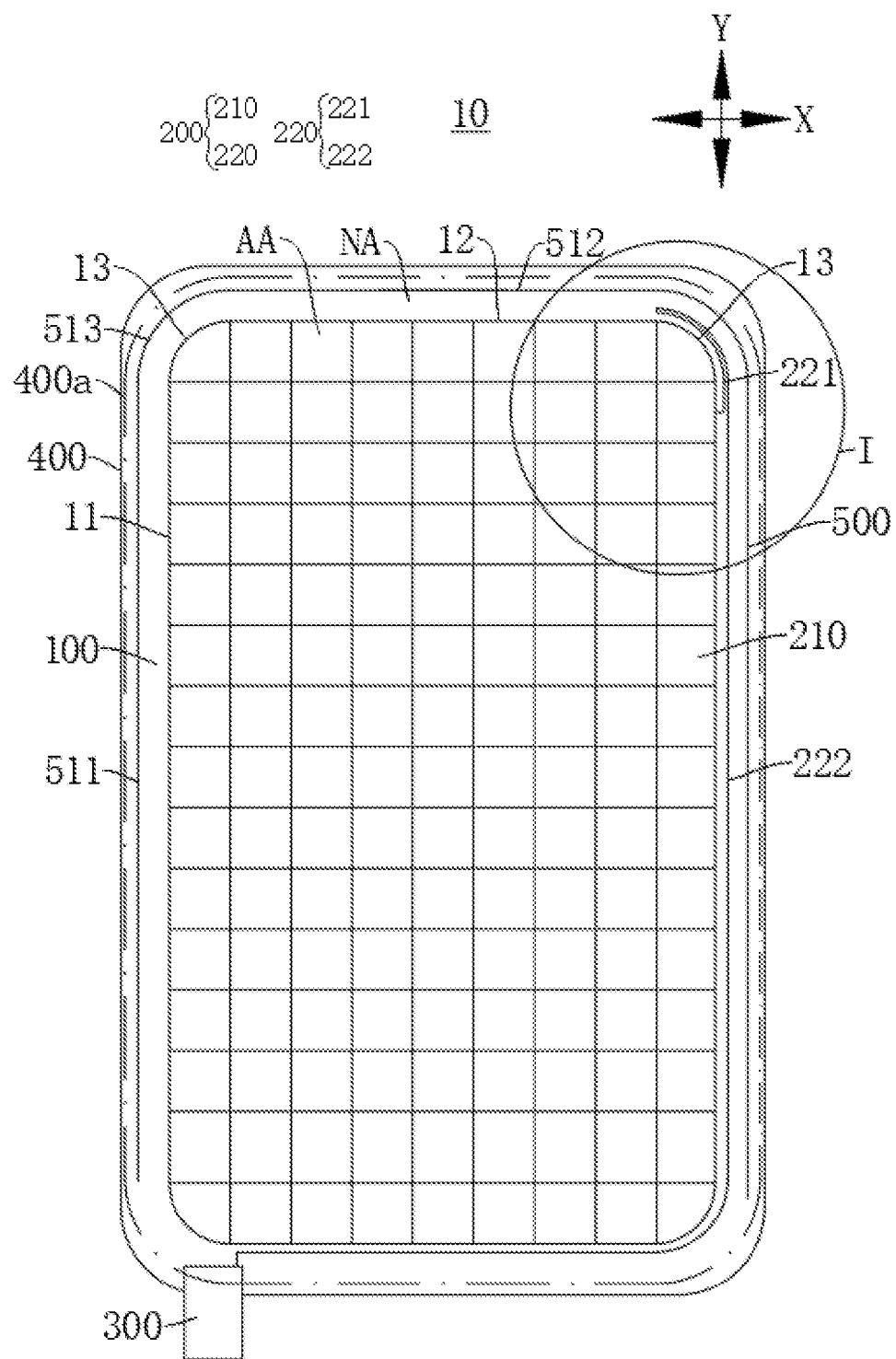
FIG. 1 is a schematic structural diagram of a display panel provided by an embodiment of a first aspect of the present application.

DESCRIPTION OF REFERENCE NUMBERS 10 display panel; 11 first edge; 12 second edge; 13 shaped edge;
100 substrate;
200 touch component; 210 touch electrode; 220 touch lead; 220a first distal end trace; 220b first proximal end trace; 220c intermediate trace; 221 first redundant winding segment; 222 connection segment; 223 second redundant winding segment; 230 terminal; 230a first distal end; 230b first proximal end; 230c intermediate terminal; 231 first terminal; 232 second terminal;
300 circuit board;
400 cutting track; 400a package edge;
500 grounding member; 510 ground wire; 511 first grounding segment; 512 second grounding segment; 513 shaped grounding segment;
600 suspension trace;
700 filling trace;
AA display area; NA non-display area;
X first direction; Y second direction.

DETAILED DESCRIPTION

Features and exemplary embodiments of various aspects of the present application are described in detail below. In the following detailed description, numerous specific details are set forth in order to provide a thorough understanding of the present application. However, it will be apparent to those skilled in the art that the present application may be practiced without some of these specific details. The following description of the embodiments is merely to provide a better understanding of the present application by illustrating examples of the present application. In the drawings and the following description, at least some well-known structures and techniques are not shown in order to avoid unnecessarily obscuring the present application; and, the dimensions of some structures may be exaggerated for clarity. Furthermore, the features, structures or characteristics described below may be combined in any suitable manner in one or more embodiments.

In the description of the present application, it should be noted that, unless otherwise stated, "multiple" means two or more. Further, the orientations or positional relationships indicated by the terms "upper", "lower", "left", "right", "inside" and/or "outside" are only used for the convenience of describing the present application and simplifying the description, rather than indicating or implying that the device or element referred to must have a specific orientation or must be constructed and operated in a specific orientation, which therefore cannot be understood as a limitation of the present application. In addition, the terms "first", "second" and the like are only used for descriptive purposes, and cannot be understood as indicating or implying relative importance.

The orientation words appearing in the following description are all directions shown in the figures, and do not limit the specific structure of the present application. In the description of the present application, it should also be noted that, unless otherwise clearly defined and limited, the terms "installed", "linked", and "connected" should be understood in a broad sense. For example, it may be a fixed connection, a detachable connection, or an integral connection; it may be a direct connection, or an indirect connection through an intermediate medium. For those of ordinary skill in the art, the specific meaning of the above-mentioned terms in the present application can be understood according to specific circumstances.

In order to better understand the present application, the following describes the display panel and the display device of the embodiments of the present application in detail with reference to FIG. 1 to FIG. 10.

Figure 2:
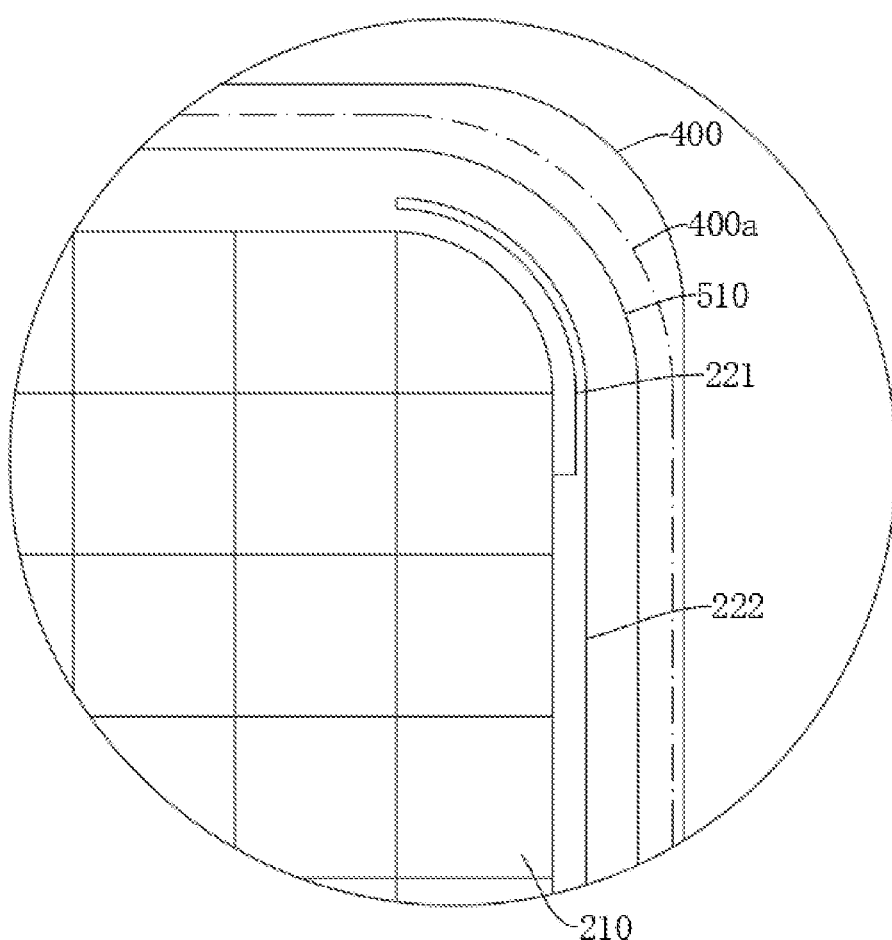
FIG. 2 is the partial enlarged structural representation of I place in FIG. 1.

Please refer to FIG. 1 and FIG. 2 together. FIG. 1 is a schematic structural diagram of a display panel 10 provided by an embodiment of a first aspect of the present application, and FIG. 2 is a partial enlarged structural schematic diagram of I place in FIG. 1.

As shown in FIG. 1 and FIG. 2, the display panel 10 provided by the embodiment of the first aspect of the present application has a display area AA and a non-display area NA, and the display panel 10 includes: a substrate 100, a touch component 200 arranged on the substrate 100, the touch component 200 including touch electrodes 210 located in the display area AA and touch leads 220 connected to the touch electrodes 210 and located in the non-display area NA; a circuit board 300 connected to the substrate 100 in the non-display area NA, the touch leads 220 being connected between the touch electrodes 210 and the circuit board 300; wherein the non-display area NA has a cutting track 400 arranged surrounding at least part of the display area AA, at least part of the touch leads 220 include first redundant winding segments 221 and connection segments 222, at least part of the first redundant winding segments 221 extend in a direction away from the circuit board 300 and are filled between the cutting track 400 and the display area AA, and the connection segments 222 are connected between the first redundant winding segments 221 and the circuit board 300.

In the display panel 10 provided in the embodiment of the present application, the display panel 10 includes a substrate 100, a touch component 200 arranged on the substrate 100 and a circuit board 300, and touch electrodes 210 of the touch component 200 are connected to the circuit board 300 through touch leads 220 so that touch signals can be transmitted between the circuit board 300 and the touch electrodes 210. At least part of the touch leads 220 include a first redundant winding segment 221 and a connection segment 222, and the first redundant winding segment 221 extends in a direction away from the circuit board 300, so that the first redundant winding segment 221 can fill the blank space between the cutting track 400 and the display area AA not filled with the connection segment 222, ensuring uniformity of wiring in the non-display area NA. The first redundant winding segment 221 is connected between the touch electrodes 210 and the circuit board 300, so that the static electricity on the first redundant winding segment 221 can be discharged, and the influence of electrostatic discharge on the touch component 200 can be improved.

In addition, in the present application, by lengthening the wiring length of some touch leads 220, the first redundant winding segment 221 is arranged on the touch leads 220 to fill the blank area between the cutting track 400 and the display area AA, which can omit the arrangement of the dummy electrode blocks, capable of not only ensuring uniformity of wiring in the non-display area NA, but also improving the influence of electrostatic discharge on the life of the touch component 200.

The cutting track 400 refers to the cutting track 400 when the display panel 10 is being cut. The first redundant winding segment 221 is arranged between the cutting track 400 and the display area AA and can be prevented from being cut and affecting signal transmission of the touch component 200 when the display panel 10 is being cut.

In some optional embodiments, please continue to refer to FIG. 1 and FIG. 2, the display panel 10 further includes a grounding member 500 arranged on the substrate 100, the grounding member 500 including a ground wire 510 arranged in the non-display area NA and surrounding at least part of the display area AA, the cutting track 400 is located on a side of the ground wire 510 away from the display area AA, and at least part of the first redundant winding segments 221 extend in a direction away from the circuit board 300 and is filled between the ground wire 510 and the display area AA.

In these optional embodiments, the first redundant winding segment 221 is located between the ground wire 510 and the display area AA, so that the distance between the first redundant winding segment 221 and the display area AA is closer, capable of not only preventing the first redundant winding segment 221 from being cut, but also better improving uniformity of wiring in the non-display area NA.

Optionally, the ground wire 510 is U-shaped and has two first grounding segments 511 extending along the second direction Y and arranged side by side on both sides of the display area AA along the first direction X, a second grounding segment 512 connected between the two first grounding segments 511, and a shaped grounding segment 513 connecting between the first grounding segment 511 and the second grounding segment 512, and the second grounding segment 512 is extended and formed along the first direction X and is separated from the circuit board 300 on opposite sides of the display area AA in the second direction Y. At least part of the first redundant winding segments 221 are located between the shaped grounding segment 513 and the display area AA.

Generally, the touch leads 220 located on both sides of the display area AA in the first direction X and the second direction Y will extend directly towards the circuit board 300, which results in formation of a blank area between the shaped grounding segment 513 and the display area AA. The redundant winding segment 221 being located in that area can better improve uniformity of wiring.

Optionally, please continue to refer to FIG. 1 and FIG. 2, the display panel 10 further includes a package structure which for example includes a package edge 400a arranged surrounding the display area AA. The cutting track 400 is located on a side of the package edge 400a away from the display area AA and the first redundant winding segment 221 is located between the package edge 400a and the display area AA, which can prevent the first redundant winding segment 221 from being cut on the one hand, and enable the package structure to protect the touch leads 220 on the other hand. The package edge 400a is illustrated in dashed-dotted lines in FIG. 1 and FIG. 2.

The package structure may be a thin-film package and includes package layers arranged in stacks, and the package edge 400a is an edge of the package layer. Alternatively, the package structure is glass powder package, the package structure includes a cover plate and a sealant, and the package edge 400a is an area where the sealant is located.

Optionally, there are various ways of trace the touch leads 220, as long as the arrangement of the dummy electrode blocks in the non-display area NA can be omitted, so that the first redundant winding segment 221 on the touch leads 220 can be arranged in the blank area between the cutting track 400 and the display area AA.

In some optional embodiments, please continue to refer to FIG. 1 and FIG. 2, the display area AA includes a first edge 11 extending along the first direction X, a second edge 12 extending along the second direction Y, and a shaped edge 13 connecting the first edge 11 and the second edge 12, at least part of the first redundant winding segments 221 being located between the shaped edge 13 and the cutting track 400. The shape of the shaped edge 13 is irregular, while the touch leads 220 generally extend from the touch electrodes 210 to the circuit board 300 along a regular path, which leads to easy formation of a blank area between the shaped edge 13 and the cutting track 400. The first redundant winding segment 221 being located in that area can better improve uniformity of wiring.

In some optional embodiments, please continue to refer to FIG. 1 and FIG. 2, a plurality of touch electrodes 210 are arranged in rows and columns along the first direction X and the second direction Y, and the circuit board 300 is located on one side of the plurality of touch electrodes 210 in the second direction Y; at least part of the first redundant winding segments 221 are located between the shaped edge 13 and the cutting track 400 on the side of the display area AA away from the circuit board 300 in the second direction Y.

In those optional embodiments, as above, the touch leads 220 located on both sides of the display area AA in the first direction X and the second direction Y will extend directly towards the circuit board 300, which leads to extremely easy formation of a blank area between the shaped edge 13 and the cutting track 400 on the side of the display area AA away from the circuit board 300 in the second direction Y. The first redundant winding segment 221 being located in that area can better improve uniformity of wiring.

Optionally, the shaped edge 13 includes a first shaped edge located in the display area AA away from the circuit board 300 in the second direction Y, two first shaped edges are located on both sides of the display area AA in the first direction X, and a first redundant winding segment 221 is arranged between each of the two first shaped edges and the cutting track 400 to better improve uniformity of wiring.

Figure 3:
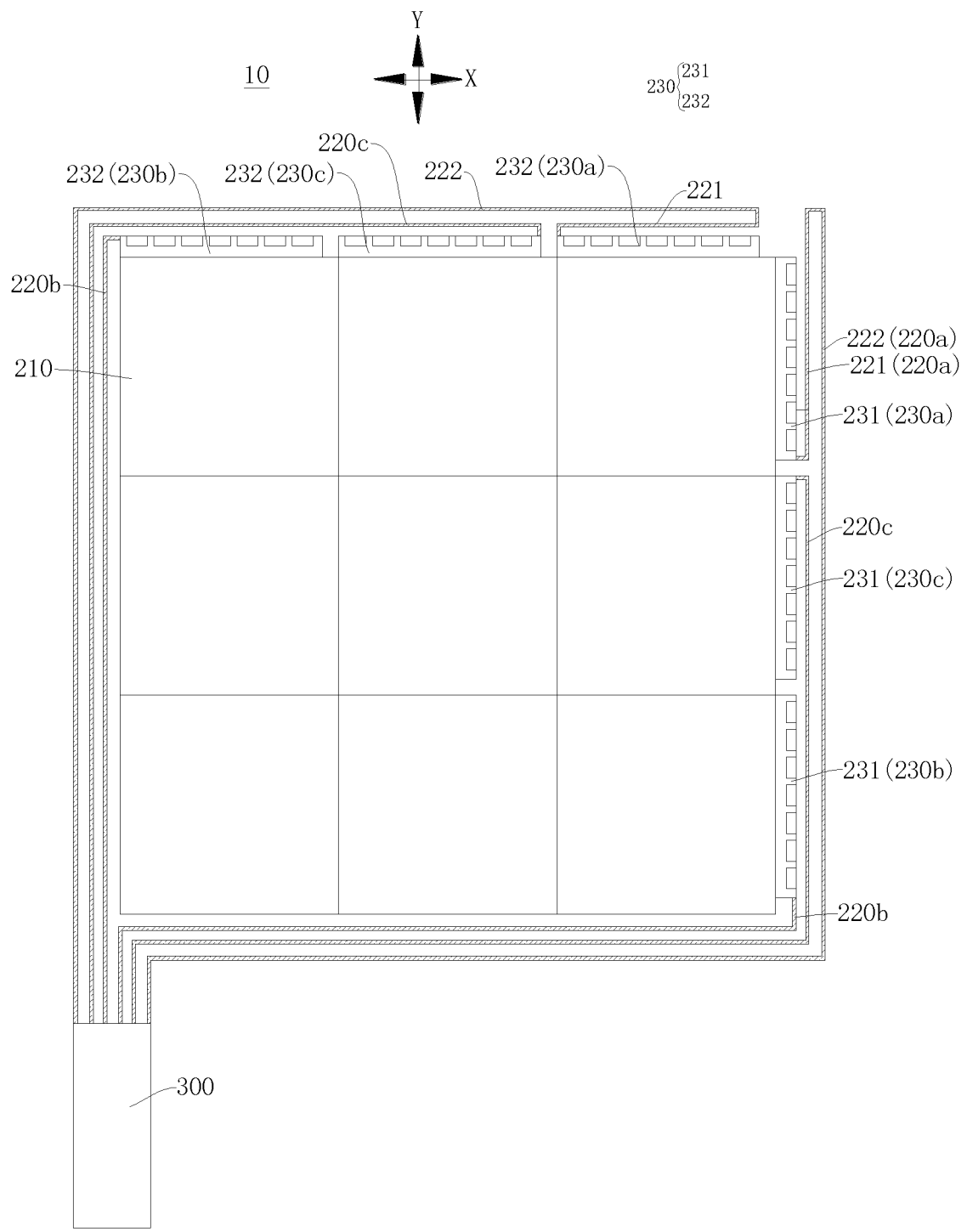
FIG. 3 is a schematic structural diagram of a display panel provided by another embodiment of the first aspect of the present application.

The number of touch electrodes 210 may be set variously. In order to better demonstrate the structure of the embodiment of the present application, please refer to FIG. 3, which is a schematic structural diagram of the display panel 10 provided by another embodiment of the first aspect of the present application. In FIG. 3, nine touch electrodes 210 arranged in three rows and three columns and touch leads 220 connected between the nine touch electrodes 210 and the circuit board 300 are used as examples for illustration. In other embodiments, the touch electrodes 210 may also be arranged in rows and columns in other numbers.

In some optional embodiments, as shown in FIG. 3, the touch component 200 further includes terminals 230 connected to the touch electrodes 210, touch leads 220 are connected between the terminals 230 and the circuit board 300, M groups of terminals 230 are on the same side of the display area AA, and at least M−1 turns of wiring are formed on the side of the M groups of terminals 230 away from the display area AA, which can ensure uniformity of wiring. As shown in FIG. 3, three groups of terminals 230 are on the same side of the display area AA in the first direction X, and two turns of wiring are formed by the touch leads 220 on the side of the three groups of terminals 230 away from the display area AA.

The positions of the terminals 230 are arranged variously, and the terminals 230 may be located in the display area AA or at the edge of the display area AA. In some other optional embodiments, the terminals 230 may also extend from the touch electrodes 210 to the non-display area NA, and the touch leads 220 are connected to the terminals 230 in the non-display area NA.

Optionally, as shown in FIG. 3, the terminals 230 include first terminals 231 located on at least one side of the display area AA in the first direction X and second terminals 232 located on at least one side of the display area AA in the second direction Y. Blocks of the touch electrodes 210 include first electrode blocks sequentially arranged along the first direction X and second electrode blocks sequentially arranged along the second direction Y.

When outgoing wires are from a single side of the first electrode block, the first terminal 231 is located on one side of the display area AA in the first direction X, and when outgoing wires are from two sides of the first electrode block, two groups of first terminals 231 are located on both sides of the display area AA in the first direction X. When outgoing wires are from a single side of the second electrode block, the second terminal 232 is located on one side of the display area AA in the second direction Y, and when outgoing wires are from two sides of the second electrode block, two groups of second terminals 231 are located on both sides of the display area AA in the second direction Y.

Figure 4:
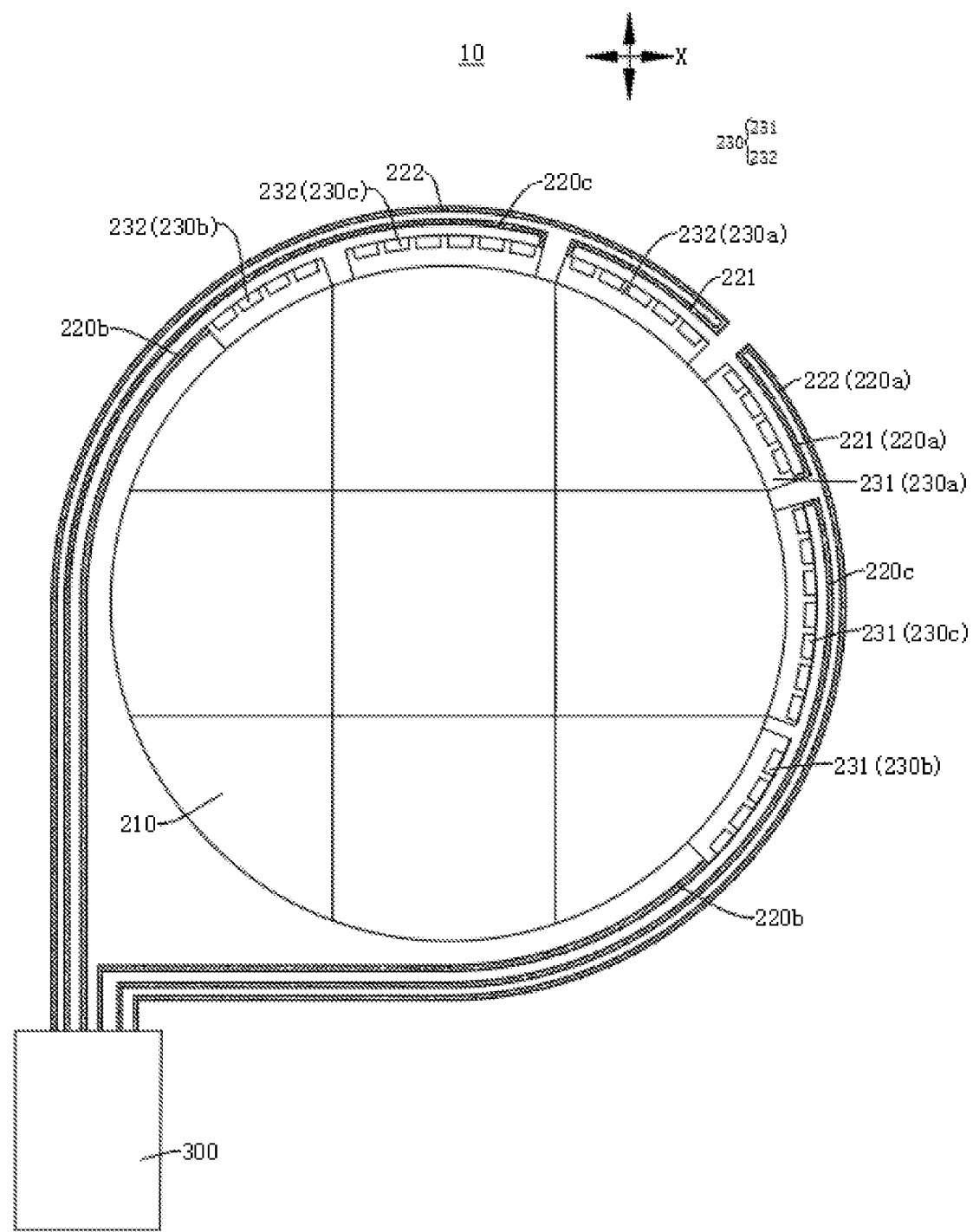
FIG. 4 is a schematic structural diagram of a display panel provided by yet another embodiment of the first aspect of the present application.

FIG. 3 takes the display area AA as a rectangle for illustration. Please refer to FIG. 4, which is a schematic structural diagram of a display panel 10 provided by yet another embodiment of the first aspect of the present application. The difference between FIG. 4 and FIG. 3 is that the shape of the display area AA is a circle, and the layout rule of the touch component 200 in FIG. 4 is the same as that in FIG. 3. That is, the arrangement of the touch leads 220 and the touch electrode blocks 210 in FIG. 4 is the same as that in FIG. 3, and the difference is that a portion of the touch leads 220 in FIG. 4 is an arc surrounding the circular display area AA.

Figure 5:
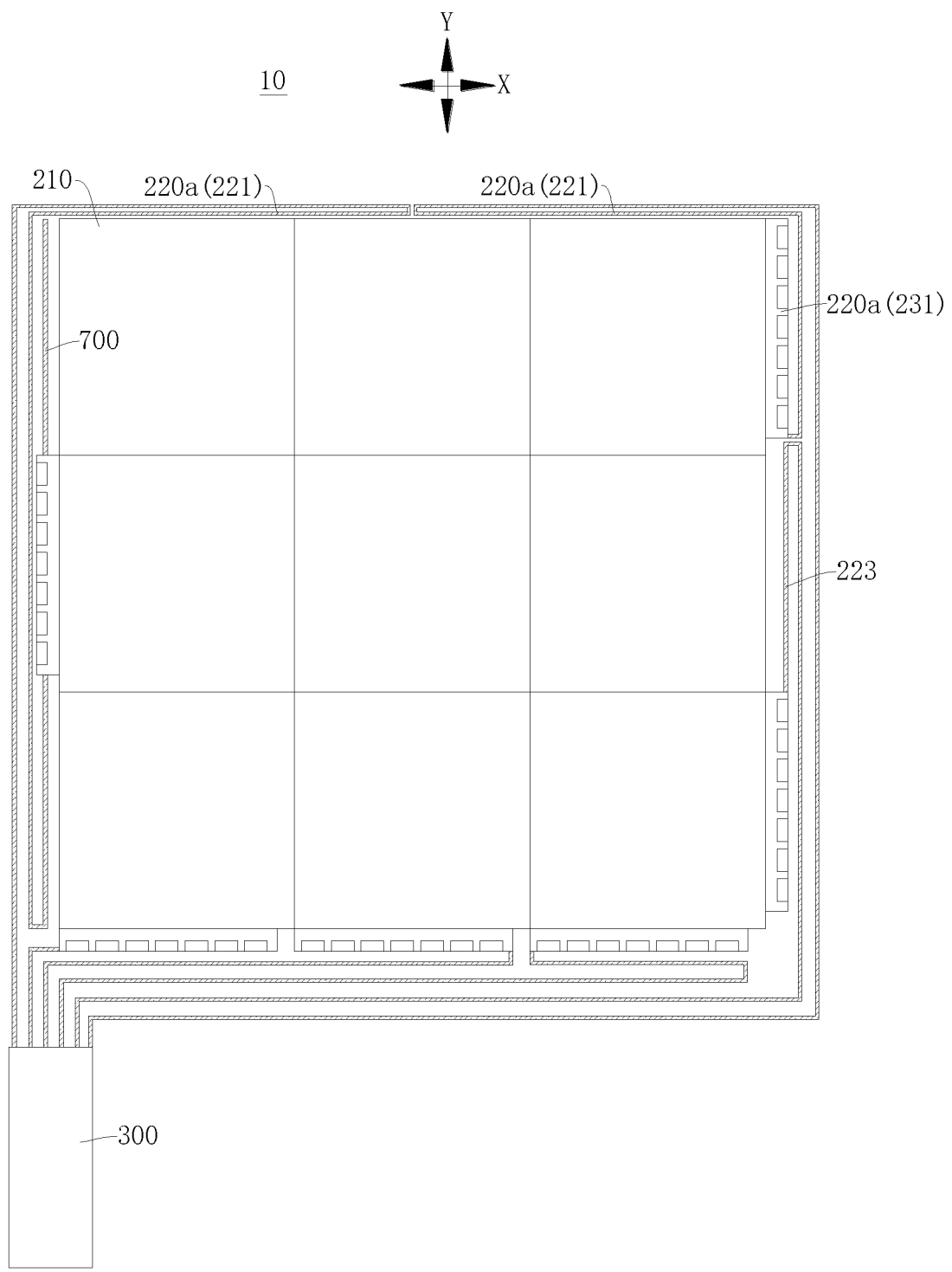
FIG. 5 is a schematic structural diagram of a display panel provided by still another embodiment of the first aspect of the present application.

Please refer to FIG. 5, which is a schematic structural diagram of a display panel 10 according to still another embodiment of the first aspect of the present application. The difference between FIG. 5 and FIG. 3 is that the ways of outgoing wires of the first electrode block and the second electrode block are different, so arrangement positions of the first terminals 231 and the second terminals 232 are different.

Optionally, when the touch leads 220 are in the structural form shown in FIG. 5, the shape of the display area AA may also be a circle.

In some optional embodiments, as shown in FIG. 5, at least two groups of terminals 230 are distributed at intervals on the same side of the display area AA, and the touch leads 220 further include a second redundant winding segment 223, at least part of the second redundant winding segment 223 being located between the two groups of terminals 230 distributed at intervals.

Please continue to refer to FIG. 5, when a plurality of touch electrodes 210 are routed on both sides of the display area AA in the first direction X, that is, when the plurality of terminals 230 are respectively arranged on both sides of the display area AA in the first direction X, an interval space may appear between adjacent two terminals 230 on the same side of the display area AA in the first direction X, and the space may cause ununiformity of wiring in the non-display area NA. At least part of the second redundant winding segment 223 is located between the two groups of terminals 230 distributed at intervals, which can further improve the ununiformity of wiring. As shown in FIG. 5, two groups of first terminals 231 are distributed at intervals on the same side of the display area AA, and at least part of the second redundant winding segment 223 is located between the two groups of first terminals 231 distributed at intervals.

In some optional embodiments, please continue to refer to FIG. 5, among the two groups of terminals 230 distributed at intervals, the terminals 230 close to the circuit board 300 are connected to the touch leads 220 that extend towards the terminals 230 away from the circuit board 300 and form the second redundant winding segment 223.

Before arranging the second redundant winding segment 223, among the two groups of terminals 230 distributed at intervals, the wiring length of the touch lead 220 connected to the terminals 230 close to the circuit board 300 is shorter than that of the touch lead 220 connected to the other terminal 230, which will result in a difference in signal transmission caused by inconsistent lengths of the touch leads 220 connected to the two groups of terminals 230 distributed at intervals. In the embodiment of the present application, the second redundant winding segment 223 is disposed on the touch lead 220 connected to the terminal 230 close to the circuit board 300 among the two groups of terminals 230 distributed at intervals, which can improve the wiring length difference and signal transmission difference, and improve the performance of the touch component 200.

Optionally, there may be an interval between two adjacent first terminals 231, or there may be an interval between adjacent second terminals 232.

For example, on one side of the display area AA in the first direction X, there are two first terminals 231 distributed at intervals along the second direction Y. As shown in FIG. 5, the distance between the lower first terminal 231 and the circuit board 300 is relatively short, and before arranging the second redundant winding segment 223, the wiring length of the touch lead 220 connected to the lower first terminal 231 is smaller than that of the touch lead 220 connected to the upper first terminal 231. Arranging the second redundant winding segment 223 on the touch lead 220 connected to the lower first terminal 231 can improve the wiring length difference between different touch leads 220, which in turn improves the difference in signal transmission and improve the performance of the touch component 200.

Further, please continue to refer to FIG. 5, when there is an interval between two adjacent first terminals 231, the touch lead 220 including the second redundant winding segment 223 can be connected to upper side of the lower first terminal 231 and extends upward to form the second redundant winding segment 223, that is, the touch lead 220 including the second redundant winding segment 223 is connected to the side of the first connection terminal away from the circuit board 300 and extend along a direction away from the circuit board 300 to form the second redundant winding segment 223, which can reduce the distance between the second redundant winding segment 223 and the display area AA, and better improve ununiformity of wiring.

In some optional embodiments, please continue to refer to FIG. 3 to FIG. 5, the M group of terminals 230 include a first distal end 230a away from the circuit board 300, and the plurality of touch leads 220 include a first distal end trace 230a connected to the first distal end 230a, and at least part of the first distal end trace 220a includes a first redundant winding segment 221.

In those optional embodiments, the first redundant winding segment 221 is arranged on the first distal end trace 220a connected to the first distal end 230a, which can avoid crossing of the touch leads caused by arranging the first redundant winding segment 221 on other touch leads 220 and affecting transmission of touch signals.

Optionally, the circuit board 300 is arranged on a side of the display area AA in the second direction Y. Optionally, the circuit board 300 may be located in the middle of the display area AA in the first direction X, or the circuit board 300 may be located on a side of the display area AA in the first direction X.

Optionally, the first distal end 230a may be the first terminal 231 or the second terminal 232.

As shown in FIG. 3 and FIG. 4, the first distal end 230a can be located on a side of the display area AA away from the circuit board 300 in the second direction Y, meanwhile the first distal end 230a is among the plurality of second terminals 232 located in the display area AA away from the circuit board 300 in the second direction Y, and the first distal end 230a is one of the plurality of second connection terminals arranged away from the circuit board 300 along the first direction X. When the first redundant winding segment 221 is disposed on the first distal end trace 220a connected to the first distal end 230a, crossing of the first redundant winding segment 221 and the touch leads 220 connected to other second terminals 232 and affecting the transmission of touch signals can be avoided.

In those optional embodiments, the first distal end trace 220a is connected to a side of the first distal end 230a close to the circuit board 300 in the first direction X and thus extends in a direction away from the circuit board 300 to form the first redundant winding segment 221, and then continues to extend and shape in a direction close to the circuit board 300.

As shown in FIG. 3 and FIG. 5, the first distal end 230a can be located at least one side of the display area AA in the first direction X, meanwhile the first distal end 230a is among the plurality of first terminals 231 located on the same side of the display area AA in the first direction X, and the first distal end 230a is one of the plurality of first connection terminals arranged away from the circuit board 300 along the second direction Y. When the first redundant winding segment 221 is arranged on the first distal end trace 220a connected to the first distal end 230a, crossing of the first redundant winding segment 221 and the touch leads 220 connected to other first terminals 231 and affecting the transmission of touch signals can be avoided.

In those optional embodiments, the first distal end trace 220a is connected to a side of the first distal end 230a close to the circuit board 300 in the second direction Y and thus extends in a direction away from the circuit board 300 to form the first redundant winding segment 221, and then continues to extend and shape in a direction close to the circuit board 300.

In some optional embodiments, please continue to refer to FIG. 5, on terminals 230 are arranged on the side of the touch electrode 210 away from the circuit board 300 in the second direction Y, and at least part of the first redundant winding segments 221 are located on the side of the touch electrode 210 away from the circuit board 300 in the second direction Y, so that the first redundant winding segment 221 can fill the blank area of the display area AA on the side away from the circuit board in the second direction Y.

Optionally, please continue to refer to FIG. 5, when a plurality of first terminals 231 are respectively arranged on both sides of the display area AA in the first direction X, both touch leads 220 connected to the terminals 230 on both sides in the first direction X include a first redundant winding segment 221 and the first redundant winding segment 221 is located on the side of the touch electrode 210 away from the circuit board 300 in the second direction Y. The first redundant winding segments 221 of the both may extend to the middle of the display area AA in the first direction X, or the first redundant winding segments 221 of both may be arranged stacked along the second direction Y.

Figure 6:
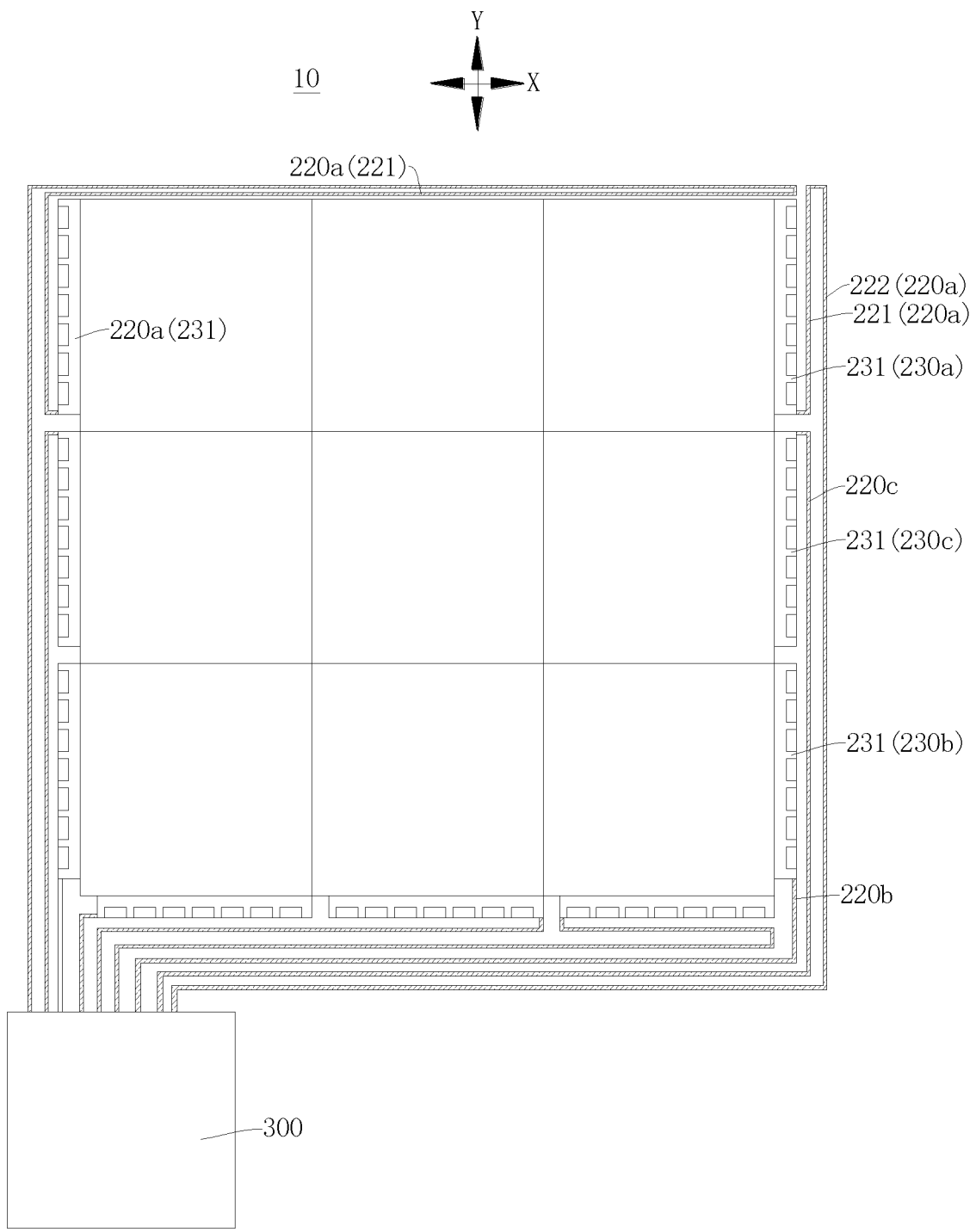
FIG. 6 is a schematic structural diagram of a display panel provided by still another embodiment of the first aspect of the present application.

Alternatively, please refer to FIG. 6, which is a schematic structural diagram of a display panel 10 provided by still another embodiment of the first aspect of the present application. Optionally, when the touch leads 220 are in the structural form shown in FIG. 6, the shape of the display area AA may also be a circle.

As shown in FIG. 6, when the plurality of first terminals 231 are respectively arranged on both sides of the display area AA in the first direction X, one of the touch leads 220 connected to the terminals 230 on both sides in the first direction X includes a first redundant winding segment 221 and the first redundant winding segment 221 is located on the side of the touch electrode 210 away from the circuit board 300 in the second direction Y.

In some optional embodiments, as shown in FIG. 3 to FIG. 6, at least part of the first redundant winding segments 221 and at least one touch lead 220 connected to other terminals 230 are located in the same turn of wiring, so as to ensure uniformity of wiring in the non-display area NA.

In some optional embodiments, as shown in FIG. 3 to FIG. 6, at least part of the first distal end trace 220a is located on the side of other touch leads 220 away from the display area AA. It can prevent the first distal end trace 220a and other touch leads 220 from crossing and affecting the transmission of touch signals.

Figure 7:
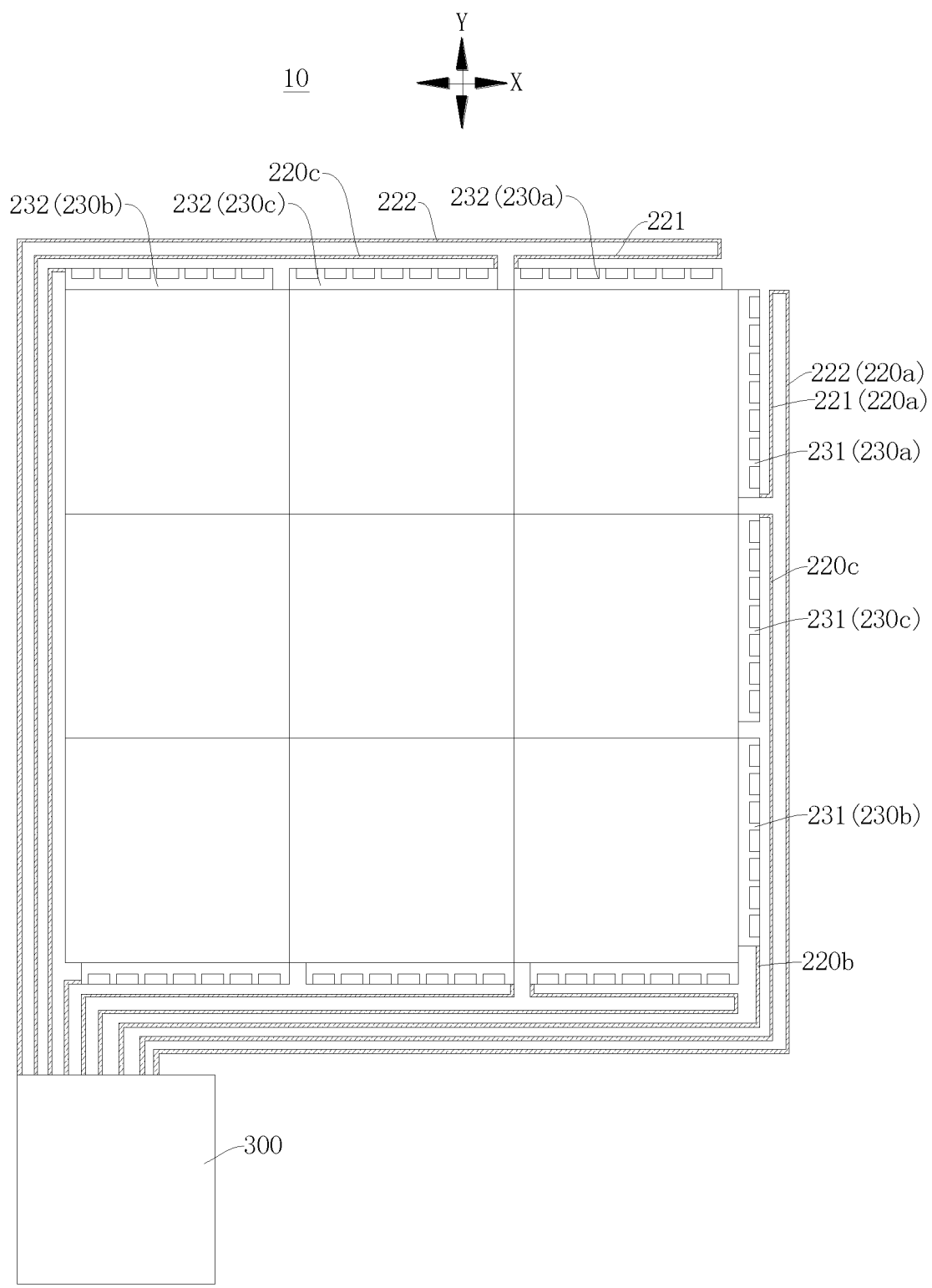
FIG. 7 is a schematic structural diagram of a display panel provided by still another embodiment of the first aspect of the present application.

Please refer to FIG. 3 to FIG. 7 together. FIG. 7 is a schematic structural diagram of a display panel 10 according to still another embodiment of the first aspect of the present application. Optionally, when the touch leads 220 are in the structural form shown in FIG. 7, the shape of the display area AA may also be a circle.

In some optional embodiments, as shown in FIG. 3 to FIG. 7, the plurality of terminals 230 include an intermediate terminal 230c located between the plurality of terminals 230 in the same row or in the same column, and the plurality of touch leads 220 includes an intermediate trace 220c connected to the an intermediate terminal 230c. When there is no interval between two adjacent intermediate terminals 230c, or when other terminals 230 are adjacent to the intermediate terminal 230c and there is no interval, the intermediate trace 220c is connected to the side of the intermediate terminal 230c away from the circuit board 300 and extends and shapes towards the circuit board 300.

The intermediate terminal 230c may be the first terminal 231 or the second terminal 232. As shown in FIG. 3, when outgoing wires are from a single side of the first electrode block, a plurality of first terminals 231 are sequentially distributed on the same side of the display area AA, the intermediate terminal 230c of the plurality of first terminals 231 is located between other first terminals 231, and the intermediate trace 220c is connected to the side of the intermediate terminal 230c away from the circuit board 300 and extends and shapes towards the circuit board 300.

In some optional embodiments, as shown in FIG. 3 to FIG. 7, the plurality of terminals 230 include a first proximal end 230b, the touch leads 220 include a first proximal end trace 220b, and the first proximal end trace 220b can be connected to the side of the first proximal end 230b away from other terminals 230 in the same row or column.

For example, as shown in FIG. 3 and FIG. 4, the plurality of terminals 230 include a first proximal end 230b located in the first terminals 231 in the same column and close to the circuit board 300, and the second direction Y is the column direction. The plurality of touch leads 220 include a first proximal end trace 220b connected to the first proximal end 230b, and the first proximal end trace 220b can be connected to the first proximal end 230b from the side of the first proximal end 230b away from other terminals 230 in the same column, so that the first proximal end trace 220b and the first proximal end 230b are arranged along the second direction Y in the non-display area NA, which can reduce one turn of leads, and in turn reduce the area of the non-display area NA and reduce the bezel size of the display panel 10.

Alternatively, as shown in FIG. 3 and FIG. 4, the plurality of terminals 230 include a first proximal end 230b located in the second terminals 232 in the same row and close to the circuit board 300, and the first direction X is the row direction. The plurality of touch leads 220 include a first proximal end trace 220b connected to the first proximal end 230b, and the first proximal end trace 220b can be connected to the first proximal end 230b on the side of the first proximal end 230b away from other terminals 230 in the same row, so that the first proximal end trace 220b and the first proximal end 230b are arranged along the first direction X in the non-display area NA, which can reduce one turn of leads, and in turn reduce the area of the non-display area NA and reduce the bezel size of the display panel 10.

Figure 8:
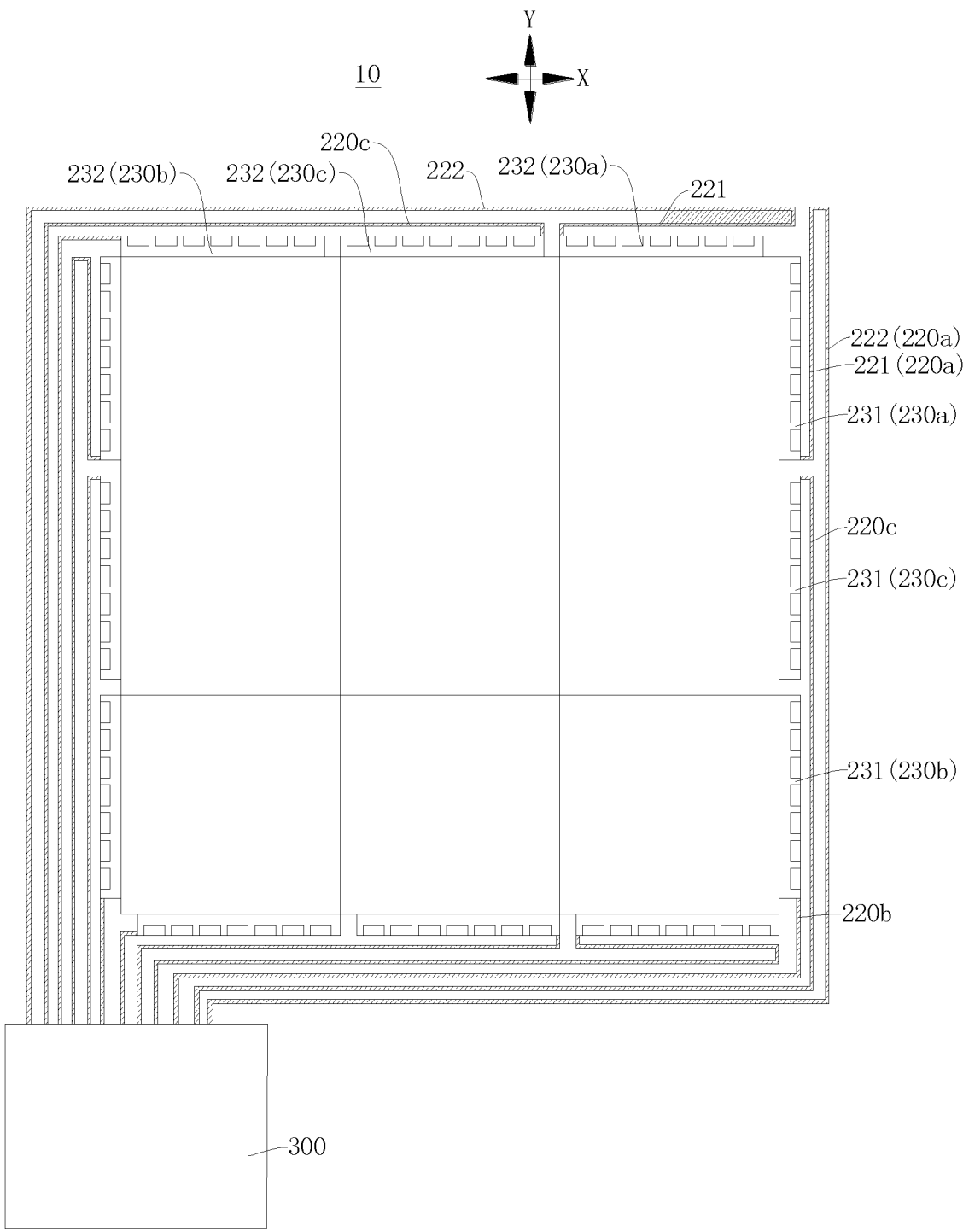
FIG. 8 is a schematic structural diagram of a display panel provided by still another embodiment of the first aspect of the present application.

Optionally, please refer to FIG. 8, which is a schematic structural diagram of a display panel 10 according to still another embodiment of the first aspect of the present application. Optionally, when the touch leads 220 have the structural form shown in FIG. 8, the shape of the display area AA may also be a circle. As shown in FIG. 8, outgoing wires are from two sides of both the first electrode block and the second electrode block, the two groups of first terminals 231 are respectively arranged on both sides of the first direction X, and the two groups of second terminals 232 are respectively arranged on both sides of the second direction Y. Each group of first terminals 231 includes a first distal end 230a, a first proximal end 230b and an intermediate terminal 230c, and each group of the plurality of second terminals 232 includes a first distal end 230a, a first proximal end 230b and an intermediate terminal 230c.

In some optional embodiments, the plurality of touch leads 220 form multiple layers of wirings in the wiring area, and the distance between two adjacent layers of wirings is 3 µm to 30 µm. On the one hand, this can avoid that the distance between the touch leads 220 is too close and thus affecting the transmission of touch signals, and on the other hand, avoid that the distance between two adjacent layers of wiring is too large and thus the size of the non-display area NA is too large.

In some optional embodiments, the line widths of the plurality of touch leads 220 are equal. For example, the line widths of the single touch lead 220 are the same, that is, the line widths at different positions of the single touch lead 220 are the same, and the line widths of the plurality of touch leads 220 are the same.

Figure 9:
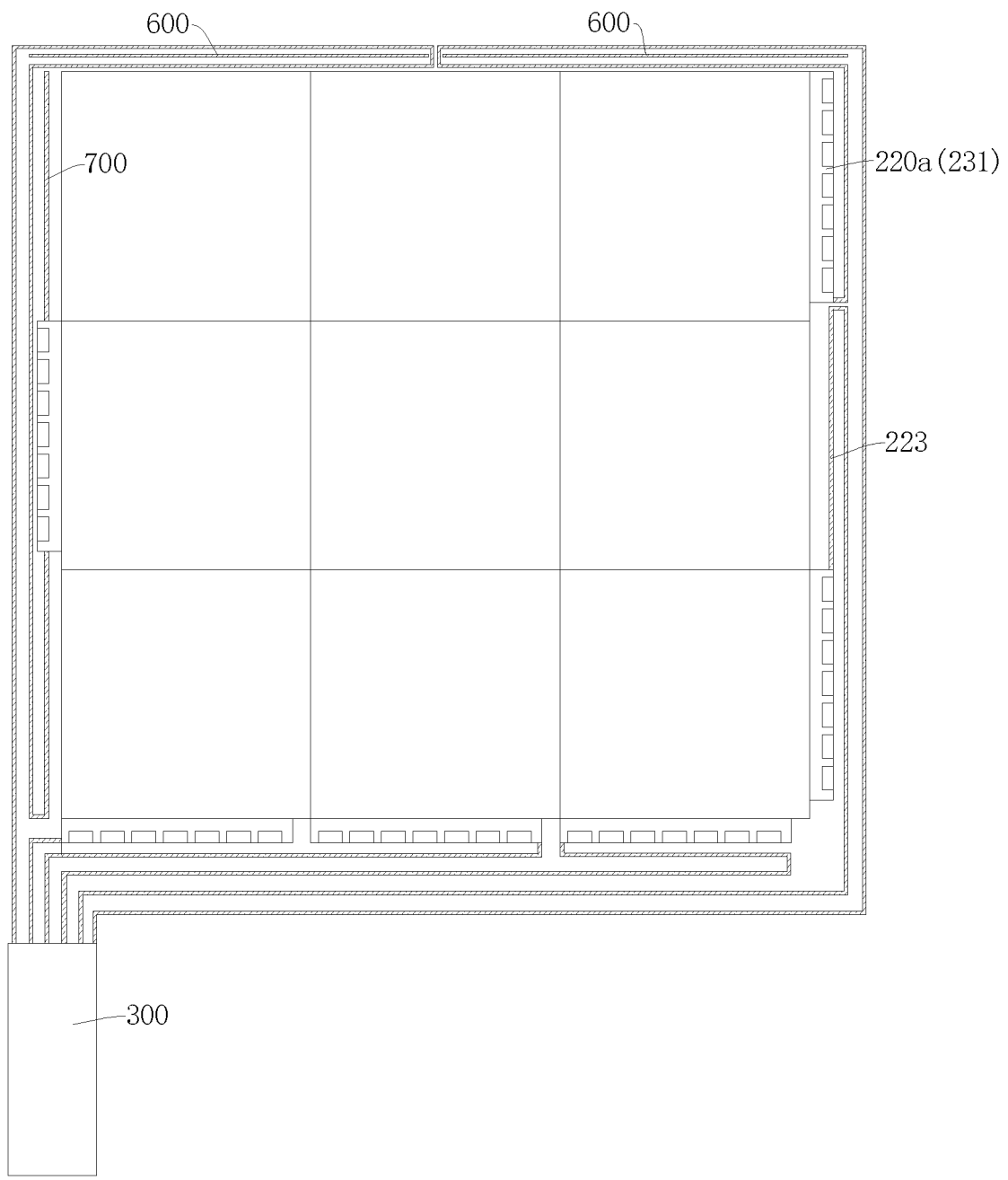
FIG. 9 is a schematic structural diagram of a display panel provided by still another embodiment of the first aspect of the present application.

Please refer to FIG. 9, which is a schematic structural diagram of a display panel 10 according to still another embodiment of the first aspect of the present application. Optionally, when the touch leads 220 have the structural form shown in FIG. 9, the shape of the display area AA may also be a circle.

In some optional embodiments, as shown in FIG. 9, the display panel 10 further includes a suspension trace 600 being suspended and not connected to other leads, and the touch leads 220 are arranged surrounding the suspension trace 600. The touch leads 220 are arranged on the periphery of the suspension trace 600. When static electricity is accumulated on the suspension trace 600 and electrostatic discharge is performed, the static electricity can be conducted to the touch leads 220 without affecting the touch electrodes 210.

Optionally, the touch leads 220 are arranged on both sides of the suspension trace 600 in the first direction X and both sides of the suspension trace in the second direction Y. The touch leads 220 on the peripheral of suspension trace may be the same touch lead 220 or may be different touch leads 220.

In some optional embodiments, please continue to refer to FIG. 5 and FIG. 9, the display panel 10 further includes a filling trace 700, one end of the filling trace 700 connected to the touch electrode 210, the other end being a free end, and the filling trace 700 is arranged adjacent to the display area AA. On the one hand, ununiformity of wiring can be improved by the filling trace 700, on the other hand, one end of the filling trace 700 is connected to the touch electrode 210, for example, one end of the filling trace 700 is connected to the touch electrode 210 through the terminal 230, which can avoid accumulation of static electricity on the filling trace 700.

In addition, in any of the above embodiments, when the touch lead 220 is provided with the first redundant winding segment 221 or the second redundant winding segment 223 so that the length difference between the plurality of touch leads 220 is too large and thus affecting the transmission of touch signals, the suspension trace 600 and/or the filling trace 700 can be arranged to reduce the length of some touch leads 220 and improve the transmission of touch signals.

Figure 10:
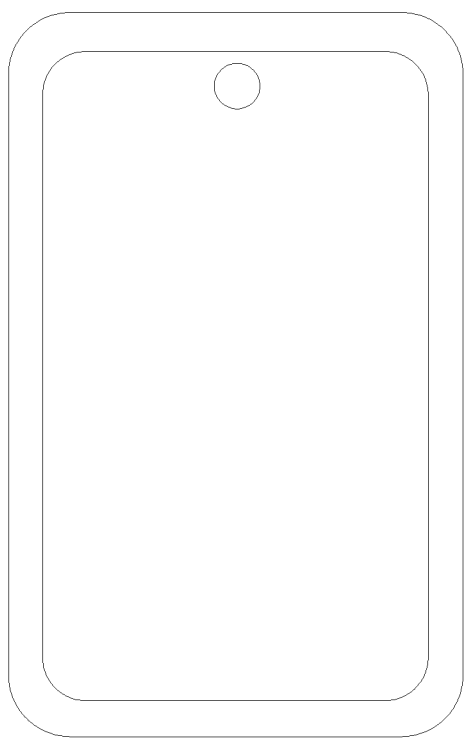
FIG. 10 is a schematic structural diagram of a display device according to an embodiment of a second aspect of the present application.

Please refer to FIG. 10, an embodiment of a second aspect of the present application further provides a display device, including the display panel of any one of the above-mentioned embodiments of the first aspect. Since the display device provided by the embodiment of the second aspect of the present application includes the display panel of any embodiment of the first aspect, the display device provided by the embodiment of the second aspect of the present application has the beneficial effect of the display panel of any embodiment of the first aspect, which will not be repeated here.

The display device in the embodiments of the present application includes but is not limited to an apparatus with a display function such as a mobile phone, personal digital assistant (Personal Digital Assistant, PDA for short), tablet computers, e-book, television, access control, smart fixed phone, consoles, etc.

While the application has been described with reference to the preferred embodiments, various modifications may be made and equivalents may be substituted for parts thereof without departing from the scope of the application. In particular, as long as there is no structural conflict, each technical feature mentioned in each embodiment can be combined in any manner. The present application is not limited to the specific embodiments disclosed herein, but includes all technical solutions falling within the scope of the claims.

What is claimed is:

1. A display panel, wherein the display panel has a display area and a non-display area, and the display panel comprises:
    a substrate,
    a touch component arranged on the substrate, the touch component comprising touch electrodes located in the display area and touch leads connected to the touch electrodes and located in the non-display area; and
    a circuit board connected to the substrate in the non-display area, the touch leads being connected between the touch electrodes and the circuit board; and
    wherein the non-display area has a cutting track arranged surrounding at least part of the display area, at least part of the touch leads comprise first redundant winding segments and connection segments, at least part of the first redundant winding segments extend along a direction away from the circuit board and fill between the cutting track and the display area, and the connection segments are connected between the first redundant winding segments and the circuit board,
    wherein the touch component further includes terminals connected to the touch electrodes, the touch leads are connected between the terminals and the circuit board, M groups of terminals are on a same side of the display area, and the touch leads form at least M−1 turns of wiring on a side of the M groups of terminals away from the display area,
    wherein the M groups of terminals include first distal ends away from the circuit board, a plurality of touch leads include first distal end traces connected to the first distal ends, and at least part of the first distal end traces include the first redundant winding segments,
    wherein the circuit board is located on a side of the display area in the second direction, and the first distal ends are located on a side of the display area away from the circuit board in the second direction, and/or the first distal ends are located on at least one side of the display area in the first direction,
    wherein the terminals are not arranged on a side of the touch electrodes away from the circuit board in the second direction, and at least part of the first redundant winding segments are located on a side of the touch electrodes away from the circuit board in the second direction.

2. The display panel according to claim 1, further comprising: a grounding member arranged on the substrate, the grounding member comprising a ground wire located in the non-display area and surrounding at least part of the display area, the cutting track being located on a side of the ground wire away from the display area, and at least part of the first redundant winding segments extending in a direction away from the circuit board and filling between the ground wire and the display area.

3. The display panel according to claim 1, wherein the display area comprises a first edge extending in a first direction, a second edge extending in a second direction, and a shaped edge connecting the first edge and the second edge, and at least part of the first redundant winding segments are located between the shaped edge and the cutting track.

4. The display panel according to claim 3, wherein a plurality of touch electrodes are arranged in rows and columns along the first direction and the second direction, and the circuit board is located on a side of the plurality of touch electrodes in the second direction; and at least part of the first redundant winding segments are located between the shaped edge and the cutting track on a side of the display area away from the circuit board in the second direction.

5. The display panel according to claim 1, wherein at least two groups of terminals are distributed at intervals on a same side of the display area, the touch leads further comprise second redundant winding segments, and at least part of the second redundant winding segments are located between the two groups of terminals distributed at intervals.

6. The display panel according to claim 5, wherein among the two groups of terminals distributed at intervals, the terminals close to the circuit board are connected to the touch leads that extend towards the terminals away from the circuit board and form the second redundant winding segments.

7. The display panel according to claim 1, wherein at least part of the first redundant winding segments and at least one of the touch leads connected to terminals other than the M groups of terminals are located in a same turn of wiring.

8. The display panel according to claim 1, wherein at least part of the first distal end traces are located on a side of touch leads other than the plurality of touch leads away from the display area.

9. The display panel according to claim 1, wherein a plurality of touch leads form multiple layers of wirings in a winding area, and a distance between two adjacent layers of wirings is 3 μm to 30 μm.

10. The display panel according to claim 1, wherein line widths of a plurality of touch leads are equal.

11. The display panel according to claim 1, further comprising a suspension trace being suspended and not connected to other leads, the touch leads being arranged surrounding the suspension trace.

12. The display panel according to claim 1, further comprising a filling trace, an end of the filling trace being connected to the touch electrodes, and the other end being a free end, and the filling trace being arranged adjacent to the display area.

13. A display device, comprising the display panel according to claim 1.

\* \* \* \* \*